US008788335B2

(12) United States Patent
Rose et al.

(10) Patent No.: US 8,788,335 B2
(45) Date of Patent: Jul. 22, 2014

(54) CONTENT DISTRIBUTION SYSTEM INCLUDING COST-PER-ENGAGEMENT BASED ADVERTISING

(75) Inventors: Robert Rose, San Diego, CA (US); Nichole Goodyear, San Diego, CA (US); Brian Douglas Derfer, San Diego, CA (US); Gina Paoni, LaJolla, CA (US)

(73) Assignee: Social Mecca, Inc., Franklin Park, IL (US)

( * ) Notice: Subject to any disclaimer, the term of this patent is extended or adjusted under 35 U.S.C. 154(b) by 1017 days.

(21) Appl. No.: 11/893,766

(22) Filed: Aug. 17, 2007

(65) Prior Publication Data

US 2008/0313040 A1    Dec. 18, 2008

Related U.S. Application Data

(60) Provisional application No. 60/944,467, filed on Jun. 15, 2007, provisional application No. 60/958,219, filed on Jul. 3, 2007, provisional application No. 60/961,899, filed on Jul. 24, 2007, provisional application No. 60/962,184, filed on Jul. 27, 2007.

(51) Int. Cl.
*G06Q 30/00* (2012.01)

(52) U.S. Cl.
USPC ........................................................ 705/14.4

(58) Field of Classification Search
None
See application file for complete search history.

(56) References Cited

U.S. PATENT DOCUMENTS

| 6,233,618 B1 | 5/2001 | Shannon |
| 6,578,008 B1 | 6/2003 | Chacker |
| 6,631,404 B1 | 10/2003 | Philyaw |
| 6,739,508 B2 | 5/2004 | Ushioda et al. |
| 6,874,024 B2 | 3/2005 | Cohen et al. |
| 7,020,635 B2 | 3/2006 | Hamilton et al. |

(Continued)

FOREIGN PATENT DOCUMENTS

| WO | WO 2009/006551 A3 | 12/2009 |
| WO | 2010/065032 A1 | 6/2010 |

OTHER PUBLICATIONS

International Search Report for International Application No. PCT/US2008/069097, International Filing Date Jul. 2, 2008, Report completed Sep. 26, 2008, mailed Oct. 8, 2008, 2 pgs.

(Continued)

*Primary Examiner* — Matthew T Sittner
(74) *Attorney, Agent, or Firm* — Barnes & Thornburg LLP

(57) ABSTRACT

Content distribution systems that support Cost-Per-Engagement (CPE) based advertising are disclosed. One embodiment includes a server connected to a network and a plurality of user computers connected to the network. In addition, the server is configured to host an interactive web site that enables the uploading of pieces of content in response to the online marketing campaign and the distribution of pieces of uploaded content, each user computer is configured to interact with the web site, the server is configured to track the number of pieces of content uploaded to the website in response to the online marketing campaign, the number of pieces of uploaded content distributed to user computers and the number of other interactions between the user computers and the website, and the server is configured to determine a cost to charge for hosting the marketing campaign based upon at least the number of pieces of content uploaded to the website in response to the online marketing campaign, the number of pieces of uploaded content distributed to user computers and the number of other interactions between the user computers and the website.

36 Claims, 2 Drawing Sheets

(56) References Cited

U.S. PATENT DOCUMENTS

| | | | |
|---|---|---|---|
| 7,020,781 | B1 | 3/2006 | Saw et al. |
| 7,035,926 | B1 | 4/2006 | Cohen et al. |
| 7,162,433 | B1 | 1/2007 | Foroutan |
| 7,353,239 | B2 | 4/2008 | Allard |
| 7,526,545 | B2 | 4/2009 | Jerome |
| 7,574,364 | B2 | 8/2009 | Hasegawa et al. |
| 7,640,181 | B2 | 12/2009 | McClure et al. |
| 7,703,611 | B1 | 4/2010 | Appelman et al. |
| 7,783,622 | B1 | 8/2010 | Vandermolen et al. |
| 2002/0120501 | A1 | 8/2002 | Bell et al. |
| 2002/0198933 | A1 | 12/2002 | Kwak |
| 2003/0171990 | A1 | 9/2003 | Rao et al. |
| 2004/0015401 | A1 | 1/2004 | Lee et al. |
| 2004/0024643 | A1 | 2/2004 | Pollock et al. |
| 2004/0034559 | A1 | 2/2004 | Harris et al. |
| 2004/0244029 | A1* | 12/2004 | Gross .............................. 725/9 |
| 2005/0044413 | A1 | 2/2005 | Elms et al. |
| 2005/0071218 | A1 | 3/2005 | Lin et al. |
| 2006/0074751 | A1 | 4/2006 | Kline et al. |
| 2006/0282283 | A1* | 12/2006 | Monahan .......................... 705/1 |
| 2006/0282336 | A1 | 12/2006 | Huang |
| 2007/0033105 | A1* | 2/2007 | Collins et al. ................... 705/14 |
| 2007/0067297 | A1* | 3/2007 | Kublickis .......................... 707/9 |
| 2007/0094076 | A1* | 4/2007 | Perkowski et al. ............. 705/14 |
| 2007/0106551 | A1* | 5/2007 | McGucken ...................... 705/10 |
| 2007/0143750 | A1 | 6/2007 | Varela et al. |
| 2007/0162761 | A1 | 7/2007 | Davis et al. |
| 2007/0168216 | A1 | 7/2007 | Lemelson |
| 2007/0180468 | A1 | 8/2007 | Gill et al. |
| 2007/0191040 | A1 | 8/2007 | Kadar et al. |
| 2007/0192863 | A1 | 8/2007 | Kapoor et al. |
| 2007/0233564 | A1 | 10/2007 | Arnold |
| 2007/0244634 | A1 | 10/2007 | Koch et al. |
| 2008/0082381 | A1* | 4/2008 | Muller et al. ...................... 705/7 |
| 2008/0091555 | A1* | 4/2008 | Heather et al. .................. 705/26 |
| 2008/0133488 | A1 | 6/2008 | Bandaru et al. |
| 2008/0140786 | A1 | 6/2008 | Tran |
| 2008/0167947 | A1* | 7/2008 | Skinner et al. .................. 705/10 |
| 2008/0172288 | A1* | 7/2008 | Pilskalns et al. ................ 705/10 |
| 2008/0244038 | A1 | 10/2008 | Martinez |
| 2008/0256233 | A1 | 10/2008 | Hall et al. |
| 2008/0262908 | A1 | 10/2008 | Broady et al. |
| 2008/0320075 | A1 | 12/2008 | Livshits et al. |
| 2009/0043654 | A1* | 2/2009 | Bates ............................... 705/14 |
| 2009/0064005 | A1 | 3/2009 | Cunningham et al. |
| 2009/0125391 | A1 | 5/2009 | Toutonghi |
| 2009/0164271 | A1 | 6/2009 | Johnson et al. |
| 2010/0042499 | A1 | 2/2010 | Barton |
| 2010/0094713 | A1* | 4/2010 | Wax ........................... 705/14.69 |

OTHER PUBLICATIONS

Written Opinion for International Application No. PCT/US2008/069097, filed Jul. 2, 2008, Opinion completed Sep. 26, 2008, mailed Oct. 8, 2008, 4 pgs.

Zooppa.com, http://www.zooppa.com/corporate/press_releases/zooppa-com-advertising-goes-social, printed from the World Wide Web on Mar. 5, 2008, 3 pages.

Votigo.com, http://web.archive.org/web/20070202023933/http://votigo.com/, retrieved from Archive.org, printed from the World Wide Web on Mar. 5, 2008, 1 page.

Votigo.com, http://web.archive.org/web/20070206165655/http://votigo.com/, retrieved from Archive.org, printed from the World Wide Web on Mar. 5, 2008, 2 pages.

Moe's Southwest Grill, http://www.moes.sharkle.com/index.html, printed from the World Wide Web on Mar. 5, 2008, 1 page.

Moe's Southwest Grill, "Moe's Southwest Grill Video Contest—Official Rules", http://www.moes.sharkle.com/rules.html, printed from the World Wide Web on Mar. 5, 2008, 2 pages.

ViTrue, Inc., "Moe's Southwest Grill Partners with ViTrue, Inc. to Launch User-Created Advertising Campaign", dated Jun. 20, 2006, 3 pages.

Tapatap.com, http://www.tapatap.com/tapatap-userweb2/contests_index.htm?offset=1360&bpld=3&bdld . . . , printed from the World Wide Web on Mar. 5, 2008, 4 pages.

Shycast.com, "Rules Summary", http://www.shycast.com/rules/ikea, printed from the World Wide Web on Mar. 5, 2008, 3 pages.

Arrington et al., "Shycast: Social Network for People & Brands—Post and Comments", http://www.techcrunch.com/2007/01/17/shycast-social-network-for-people-brands/, printed from the World Wide Web on Mar. 5, 2008, 10 pages.

Kjeldsen et al., "Bix sees green in online contests—Post and Comments", dated Jul. 17, 2006, http://www.techcrunch.com/2006/07/17/bix-sees-green-in-online-contests/, printed from the World Wide Web on Mar. 5, 2008, 9 pages.

Kirkpatrick, Techcrunch.com, "Bix Posts", http://www.techcrunch.com/tag/bix/, printed from the World Wide Web on Mar. 5, 2008, 4 pages.

Rollmio.com, "What is rollmio", http://rollmio.com/nodes/view/whats, dated Aug. 8, 2007, printed from the World Wide Web on Apr. 23, 2008, 3 pages.

VMIX.com, "Official Rules—VMIX.com—JVC Create Our Commercial Contest", http://www.vmix.com/promos/jvc/rules.php, printed from the World Wide Web on Mar. 5, 2008, 1 page.

VMIX.com, "VMIX Past Online Contests and Sweepstakes", http://www.vmix.com/contests-past.php, printed from the World Wide Web on Mar. 5, 2008, 2 pages.

VMIX, "Enter the JVC "Create Our Commercial" Online Video Contest for free at VMIX.com!", http://www.vmix.com/jvc.php, printed from the World Wide Web on Mar. 5, 2008, 1 page.

Beaumont, "Napoleon Dynamite Dance Off Challenge!", http://blogcritics.org/archives/2006/05/04/032537.php, printed from the World Wide Web on Mar. 5, 2008, 3 pages.

PR Newswire Association LLC, "Do You Have the Hottest Dad in America?", http://www.prnewswire.com/cgi-bin/stories.pl?ACCT=104&STORY=/www/story/04-24-20 . . . , printed from the World Wide Web on Mar. 5, 2008, 2 pages.

The ARF, "Engagement: Definitions and Anatomy", dated Mar. 21, 2006, 21 pages.

Cramphorn et al., "Global Advertising that Sells—Progressing Towards the Holy Grail!", Part 5 / Can Advertising Travel?, Congress 2005, ESOMAR 2005, 10 pages.

International Search Report for International Application No. PCT/US2008/069223, Report completed Aug. 27, 2008, mailed Sep. 3, 2008, 3 pgs.

Written Opinion for International Application No. PCT/US2008/069223, Opinion completed Aug. 28, 2008, mailed Sep. 3, 2008, 5 pgs.

International Search Report for International Application PCT/US2008/069093, Report completed Aug. 23, 2008, mailed Sep. 3, 2008, 3 pgs.

Written Opinion for International Application PCT/US2008/069093, Opinion completed Aug. 23, 2008, mailed Sep. 3, 2008, 6 pgs.

International Search Report for International Application PCT/US2008/069264 filed Jul. 3, 2008, Report completed Oct. 24, 2008, mailed Nov. 3, 2008, 3 pgs.

Written Opinion of the International Searching Authority for International Application PCT/US2008/069264 filed Jul. 3, 2008, Opinion completed Oct. 24, 2008, mailed Nov. 3, 2008, 4 pgs.

U.S. Appl. No. 60/820,077, filed Jul. 21, 2006, 19 pgs.

Office Action issued in U.S. Appl. No. 12/497,916, 44 pgs., (Jan. 16, 2014).

* cited by examiner

CONTENT DISTRIBUTION SYSTEM INCLUDING COST-PER-ENGAGEMENT BASED ADVERTISING

CROSS-REFERENCE TO RELATED APPLICATIONS

The present invention claims priority to U.S. Provisional Application Ser. No. 60,944,467 entitled "Online Content Marketing Platform" to Rose et al., filed Jun. 15, 2007, U.S. Provisional Patent Application Ser. No. 60/958,219 entitled "Online Content Marketing Platform" to Rose et al., filed on Jul. 3, 2007, U.S. Provisional Application Ser. No. 60/961,899 entitled "Content Distribution System Including Cost-Per-Engagement Based Advertising" to Rose et al., filed Jul. 24, 2007, and U.S. Provisional Application Ser. No. 60/962,184 entitled "System and Method for Voting in Online Competitions" to Rose et al., filed Jul. 27, 2007, the disclosure of which is expressly incorporated by reference herein in its entirety. The present application is also related to the U.S. Patent Application entitled "Online Marketing Platform" to Rose et al., filed Aug. 17, 2007 and the U.S. Patent Application entitled "System and Method for Voting in Online Competitions" to Rose et al., filed Aug. 17, 2007, the disclosure of which is also expressly incorporated by reference herein in its entirety.

BACKGROUND

The present invention relates generally to online marketing and more specifically to content distribution systems that distribute advertising in conjunction with content.

Advertisers are increasingly using the Internet to reach consumers with marketing messages. Many early Internet marketing campaigns involved payment for placement of banner advertisements on web pages on a cost per thousand impressions (CPM) basis. Under a CPM basis, the advertiser pays an amount for each user that visits a web site irrespective of whether the user pays any attention to the banner advertisement. In an attempt to measure the effectiveness of placing advertising on a particular web site at driving traffic to an advertiser's own web site, marketing arrangements involving the Internet have grown to include in addition to CPM, the more quantifiable cost-per-click (CPC) basis. Under a CPC model, advertisers measure the number of visitors to a web site that view an advertisement or key word and click through the advertisement or key word to a web site designated by the advertiser.

Over time, the CPC model has been enhanced and automated by companies such as Google, Inc. of Mountain View, Calif. For example, search engines now provide an advertiser with the opportunity to bid on a CPC basis for search terms that will drive traffic to the advertiser's web site. In addition, web site owners now have the option of including contextually relevant advertising on their web sites for a percentage of CPC revenue derived when visitors to the web site click through an advertisement.

A number of web sites exist that enable users to distribute User Generated Content (UGC). The term "user generated content" (UGC) is commonly used to refer to electronic media posted on the Internet by an individual. Examples of UGC include text posted in the form of a blog, audio posted in the form of a podcast, images posted as photos or graphic designs, video uploaded to a media sharing web site, various combinations of these forms of media, and other media types including SMS text messages, MMS messages, non-digital media, and new media types. A feature of UGC is that it typically relies upon viral distribution to reach its audience, often through web sites such as, but not limited to, MySpace, Xanga, and YouTube that facilitate the distribution and exchange of UGC. "Viral distribution" is a term that is used to describe the distribution of information or media as a result of one to one or one to many interactions between individual users.

As an alternative to banner advertisements, a number of advertisers are using web sites that distribute UGC to conduct advertising campaigns. In several instances, advertisers have purchased the rights to popular UGC and incorporated an advertising message or associated a brand with the UGC. Another approach has been to produce advertisements that have the look and feel of UGC and to distribute the advertisements via the same web sites that distribute actual UGC. More sophisticated advertising campaigns involve the creation of a web site that distributes UGC that is solicited in relation to a product or idea. Examples of such web sites include web sites that solicit ideas for new products, ideas for new packaging designs and/or ideas for product advertising campaigns.

Many advertising campaigns that utilize UGC or web sites that distribute UGC are not necessarily intending for users to link to a web site and purchase goods. The primary objectives of many UGC based campaigns are to create brand awareness, communicate a message and/or increase user engagement with a brand or product.

SUMMARY OF THE INVENTION

Systems and methods are described that enable distribution of content and that can host online marketing campaigns in conjunction with the distribution of content. Content distribution systems in accordance with embodiments of the invention distribute content to users and measure user interactions with the distributed content. A marketing campaign is conducted in conjunction with the distribution of content and the content distribution system determines the cost of conducting the marketing campaign based upon the measured user interactions with the content in accordance with a prearranged agreement. In many embodiments, the content distribution system automatically bills the cost to the advertiser responsible for the marketing campaign. One embodiment of the invention includes a server connected to a network and a plurality of user computers connected to the network. In addition, the server is configured to host an interactive web site that provides access to at least one piece of content that forms part of the marketing campaign, each user computer is configured to interact with the web site, the server is configured to track the number of times the at least one piece of content that forms part of the marketing campaign is accessed and the number of other interactions that user computers have with the web site and the server is configured to determine a cost to charge for hosting the marketing campaign based upon at least the number of times the at least one piece of content that forms part of the marketing campaign is accessed and the number of other interactions that user computers have with the web site.

In a further embodiment, the interactive web site enables the uploading of pieces of content in response to the online marketing campaign and the distribution of pieces of uploaded content and the at least one piece of content that forms part of the marketing campaign is a piece of uploaded content.

In another embodiment, the web site enables user computers to vote for a piece of content and the interactions tracked by the server include tracking the number of votes cast from user computers with respect to the at least one piece of content that forms part of the marketing campaign.

In a still further embodiment, the web site enables user computers with respect to post comments with respect to a piece of content and the interactions tracked by the server include tracking the number of comments posted from user computers with respect to the at least one piece of content that forms part of the marketing campaign.

In still another embodiment, the web site enables a first user computer to be used to recommend a piece of content to a second user computer and the interactions tracked by the server include tracking the number of times the at least one piece of content that forms part of the marketing campaign is recommended.

In a yet further embodiment, the web site enables a user computer to automatically propagate a piece of content to another web site and the interactions tracked by the server include tracking the number of times that at least one piece of content that forms part of the marketing campaign is propagated to another web site.

In yet another embodiment, the user computers are configured to interact with pieces of content that have been automatically propagated to other websites, and the server is configured to track interactions between user computers and propagated pieces of content.

In a further embodiment again, the web site includes a web page that enables a user computer to mouse over a region of the web page to obtain additional information concerning a piece of content and the interactions tracked by the server include tracking the number of times that additional information is obtained concerning at least one piece of content that forms part of the marketing campaign.

In another embodiment again, the web site includes web pages that enable a user computer to click on a region of the web page to access a piece of content.

In a further additional embodiment, the web site includes a web page that enables a user computer to click on multiple regions of the web page to access a piece of content and the interactions tracked by the server include tracking the number of times that each of the regions is clicked on to access the at least one piece of content that forms part of the marketing campaign.

In another additional embodiment, the web site includes web pages that enable a user computer to click on a region of the web page to play a piece of content and the interactions tracked by the server include tracking the number of times that the at least one piece of content that forms part of the marketing campaign is played.

In a yet still further embodiment, at least one piece of content that forms part of the marketing campaign is text posted in the form of a blog.

In yet still another embodiment, at least one piece of content that forms part of the marketing campaign is audio posted in the form of a podcast.

In a yet further embodiment again, at least one piece of content that forms part of the marketing campaign is an image.

In yet another embodiment again, at least one piece of content that forms part of the marketing campaign is a video.

In a yet further additional embodiment, the video is a mashup.

In yet another additional embodiment, the server is configured to track a plurality of different types of interactions that user computers have with the web site and the server is configured to determine the cost to charge for hosting the marketing campaign by taking a weighted sum of the number of times the at least one piece of content that forms part of the marketing campaign is accessed and the number of at least one of the different types of tracked interaction.

In a still further embodiment again, the server is configured to automatically bill an entity associated with the online campaign for the determined cost to charge for hosting the marketing campaign.

Still another embodiment again includes a server connected to a network, and a plurality of user computers connected to the network. In addition, the server is configured to host an interactive web site that enables the uploading of pieces of content in response to the online marketing campaign and the distribution of pieces of uploaded content, each user computer is configured to interact with the web site, the server is configured to track the number of pieces of content uploaded to the website in response to the online marketing campaign, the number of pieces of uploaded content distributed to user computers and the number of other interactions between the user computers and the website, and the server is configured to determine a cost to charge for hosting the marketing campaign based upon at least the number of pieces of content uploaded to the website in response to the online marketing campaign, the number of pieces of uploaded content distributed to user computers and the number of other interactions between the user computers and the website. In addition, the server can be configured to measure the time a user spends on the interactive web site.

In a still further additional embodiment, the web site enables user computers to vote for a piece of content uploaded in response to the marketing campaign and the interactions tracked by the server include tracking the number of votes cast from user computers with respect to pieces of content uploaded in response to the marketing campaign.

In still another additional embodiment, the web site enables user computers to post comments with respect to pieces of content uploaded in response to the marketing campaign, and the interactions tracked by the server include tracking the number of comments posted from user computers with respect to pieces of content uploaded in response to the marketing campaign.

In a further additional embodiment again, the web site enables a first user computer to be used to recommend a piece of content uploaded in response to the marketing campaign to a second user computer and the interactions tracked by the server include tracking the number of times pieces of content uploaded in response to the marketing campaign are recommended.

In another additional embodiment again, the web site enables a user computer to automatically propagate a piece of content uploaded in response to the marketing campaign to another web site and the interactions tracked by the server include tracking the number of times pieces of content uploaded in response to the marketing campaign are propagated to another web site.

In another further embodiment, the user computers are configured to interact with pieces of content that have been automatically propagated to other websites, and the server is configured to track interactions between user computers and propagated pieces of content.

In yet another further embodiment, the web site includes a web page that enables a user computer to mouse over a region of the web page to obtain additional information concerning a piece of content uploaded in response to the marketing campaign, and the interactions tracked by the server include tracking the number of times that additional information is obtained concerning pieces of content uploaded in response to the marketing campaign.

In still another further embodiment, the web site includes web pages that enable a user computer to click on a region of the web page to access a piece of content uploaded in response to the marketing campaign.

In another further embodiment again, the web site includes a web page that enables a user computer to click on multiple regions of the web page to access a piece of content uploaded in response to the marketing campaign, and the interactions tracked by the server include tracking the number of times that each of the regions is clicked on to access a piece of content uploaded in response to the marketing campaign.

In another further additional embodiment, the web site includes web pages that enable a user computer to click on a region of the web page to play a piece of content uploaded in response to the marketing campaign, and the interactions tracked by the server include tracking the number of times that pieces of content uploaded in response to the marketing campaign are played.

In still yet another further embodiment, the pieces of content uploaded in response to the marketing campaign include text posted in the form of a blog.

In yet another further embodiment again, the pieces of content uploaded in response to the marketing campaign include audio posted in the form of a podcast.

In yet another further additional embodiment, the pieces of content uploaded in response to the marketing campaign include an image.

In still another further embodiment again, the pieces of content uploaded in response to the marketing campaign include video.

In still another further additional embodiment, the video is a mashup.

In another further additional embodiment again, the server is configured to track a plurality of different types of interactions that user computers have with the web site and the server is configured to determine the cost to charge for hosting the marketing campaign by taking a weighted sum of the number of times the at least one piece of content that forms part of the marketing campaign is accessed and the number of at least one of the different types of tracked interaction.

In still yet another further embodiment again, the server is configured to automatically bill an entity associated with the online campaign for the determined cost to charge for hosting the marketing campaign.

One embodiment of the method of the invention includes providing an interactive web site that enables access to at least one piece of content associated with the online marketing campaign, receiving a plurality of different user requests, responding to each of the user requests, tracking the number of each different type of user request and calculating a cost to charge for conducting the online marketing campaign as a function of the numbers of request tracked for each different type of request.

A further embodiment of the method of the invention also includes automatically billing an entity associated with the online marketing campaign for the cost of conducting the online marketing campaign.

Another embodiment of the method of the invention includes providing an interactive web site that enables the uploading of pieces of content in response to the online marketing campaign and the distribution of pieces of uploaded content, uploading content to the website, tracking a plurality of categories of user interactions with the website and the uploaded content and calculating a cost for conducting the online marketing campaign based upon the different categories of tracked interactions.

A still further embodiment of the invention also includes automatically billing an entity associated with the online marketing campaign for the cost of conducting the online marketing campaign.

DETAILED DESCRIPTION OF THE INVENTION

Turning now to the drawings, content distribution systems that support Cost-Per-Engagement (CPE) based online marketing campaigns in accordance with embodiments of the invention are shown. CPE refers to the process of determining the cost of hosting an online marketing campaign based upon measurements of user engagement with the marketing campaign. Engagement is a term that can be used to describe the level of interest and/or interaction that a user has with a campaign or a portion of a campaign such as a specific piece of content. The level of engagement that a user has with an online marketing campaign is considered to be a measure of the success of an online marketing campaign with respect to that user. A user who is highly engaged with an online marketing campaign is often prompted to respond to the campaign in ways that will often attract interest from other users. Therefore, highly engaged users can be identified based upon the interactions they have with the campaign.

An online marketing campaign can utilize any of a variety of mechanisms to prompt a user to interact with an idea, a theme and/or content associated with the campaign. In many embodiments, an online marketing campaign is conducted that involves distributing one or more pieces of content that incorporate the ideas and/or themes of the campaign. In several embodiments, an online marketing campaign is conducted that involves providing an interactive web site that solicits content in response to an idea or theme. U.S. Provisional Patent Application Ser. No. 60/958,219 entitled "Online Content Marketing Platform" to Rose et al., filed on Jul. 3, 2007, discloses several examples of web sites that enable advertisers to solicit UGC in response to a marketing campaign and that enable users to interact with the content, the site and each other. U.S. Provisional Patent Application Ser. No. 60/958,219 entitled "Online Content Marketing Platform" to Rose et al. is incorporated by reference in its entirety above. Many online marketing campaigns in accordance with embodiments of the invention include sites that are entirely dedicated to the campaign (i.e. provide 100%. Share of Voice) or areas within a site that is dedicated to the campaign (i.e. provide 100% Share of Voice within a portion of the site).

In embodiments where the online marketing campaign involves distributing one or, more pieces of content, the CPE can be calculated based upon engagement with the distributed pieces of content. In embodiments where the advertisement is a marketing campaign soliciting UGC content, the CPE can be calculated based upon engagement with all UGC submitted in response to the campaign. In embodiments involving other types of online marketing campaigns with which users can engage, the CPE can be calculated based upon the user engagement.

Content Distribution Systems

Figure 1:
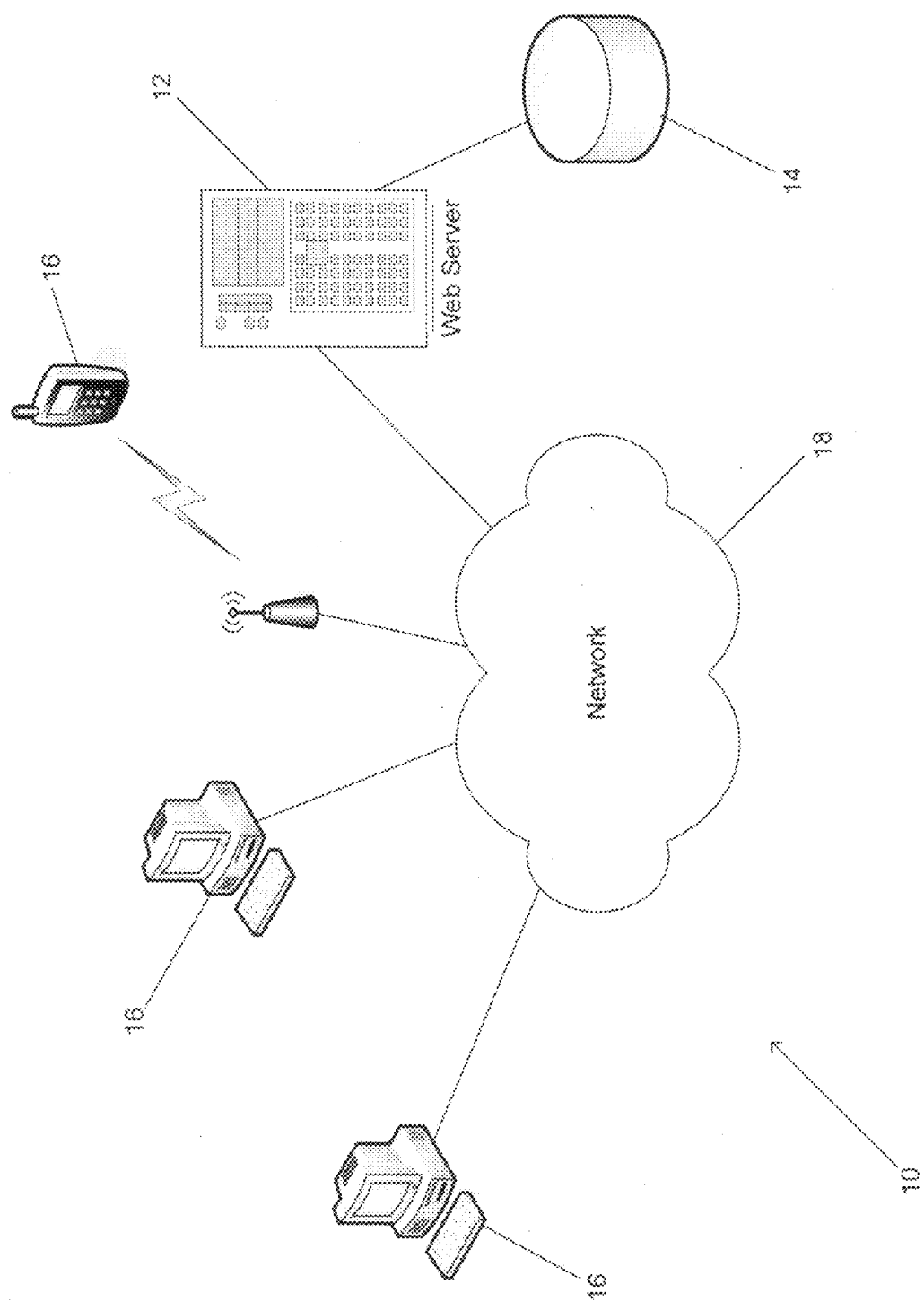
FIG. 1 is a schematic diagram showing a content distribution system supporting Cost-Per-Engagement (CPE) based advertising.

A content distribution system in accordance with an embodiment of the system is shown in FIG. 1. The system 10 includes a server 12 connected to a database 14. The server is able to communicate with user devices 16 via a network 18. The server 12 handles communications with user devices 16 and with a database management system that facilitates the storage and retrieval of information from the database. Although the server 12 is shown as a single server in FIG. 1, many embodiments of the invention include multiple servers connected via a private network. Server architectures that can be used in a content distribution system in accordance with embodiments of the invention are shown in U.S. Provisional Patent Application Ser. No. 60/958,219 entitled "Online Content Marketing Platform" to Rose et al., filed on Jul. 3, 2007, the disclosure of which is incorporated by reference in its entirety above.

In several embodiments, the database 14 stores content that can be distributed to user devices 16 over the network 18 by the server 12. In embodiments where the content distribution system distributes UGC, content can be uploaded to the database 14 from user devices 16 via the server 12. In a number of embodiments, information concerning users is stored in the database. The database can be used to store user profiles and information concerning requests received from user devices 16 in relation to specific pieces of content. As will be discussed below, information recorded in the database can be used to determine user engagement with a specific piece of content and/or an entire online marketing campaign hosted by the server.

In the illustrated embodiment, the user devices are implemented using personal computers and a hand held device such as a cell phone. In other embodiments, a user device can be any device capable of communicating with the server. User devices can include, but are not be limited to, a consumer electronics device, a Personal Digital Assistant and a computer operating in conjunction with a cell phone handset.

In the embodiment illustrated in FIG. 1, the user devices 16 connect with the server 12 via a network. Typically, the network that user devices use to communicate with a server in accordance with embodiments of the invention is the Internet. However, embodiments of the invention can be implemented using almost any type of network that enables the exchange of information between the server and user devices. In a number of embodiments, the network is a publicly accessible network. In several embodiments, the network is a private network, such as a cable network or a wireless network that is accessible on a subscription basis.

The user devices 16 are configured to make requests to the server 12 enabling the user devices to interact with content stored in the database 14. Each user interaction typically involves a communication from a user device 16 to the server 12 and the server is configured to measure user interaction with an online marketing campaign based upon the communications. A user interaction is essentially any action taken by a user in response to an online marketing campaign. As is discussed further below, the interactions that a user can have with respect to an online marketing campaign are determined by the nature of the campaign. The most common form of interaction is to view content associated with the campaign. In applications that include audio and/or video, interaction can also include, but is not limited to, playing the content. Other forms of interaction can include creating and uploading UGC in response to a campaign, voting for a piece of content, rating a piece of content, posting a comment or review with respect to a piece of content and rating the usefulness of a posted comment or review. In a number of embodiments, the server supports more advanced user interactions including the viral distribution of content such as the recommendation of a piece of content from one user to another user and/or the automatic propagation of a piece of content to another web site. Examples of various user interactions with content that can be supported by servers in specific applications, including viral distribution of content, are further discussed below.

In a number of embodiments, an online marketing campaign involves the distribution of one or more pieces of content. In these embodiments, an advertiser uploads the content to the database and utilizes the content distribution system to distribute the content. In many embodiments, the content distribution system facilitates the initial distribution of content by featuring the content and/or recommending the content to users. In several embodiments, the advertiser uses other advertising channels to influence an initial group of users to access the content. Once an initial group of users has accessed the content, mechanisms provided by the content distribution system can be used by users to virally distribute the content. Viral distribution mechanisms are discussed further below. In many embodiments, user engagement with the content is used as a proxy for the success of the content distribution system in distributing the online marketing campaign. The server can measure various user interactions with the content and an engagement metric or engagement score can be determined in accordance with a prearranged formula. In a number of embodiments, the formula is a weighted sum of measures associated with specified types of user interactions. Higher weightings can be attributed to types of user interactions that indicate deeper levels of engagement with the advertisement. For example, viewing the content can be ascribed a comparatively lesser value to the value ascribed to recommendation of the content to another user. In other embodiments, other formulae are used to determine an engagement score including a direct sum of different forms of user engagement.

In several embodiments, the content distribution system supports an online marketing campaign that solicits UGC from users in response to a specific campaign theme or idea. In these embodiments, users upload UGC submissions and other users can interact with the uploaded submissions. The act of uploading a UGC submission is a form of user interaction that can be considered to involve a very high level of engagement with the marketing campaign. A server can measure the number of UGC submissions uploaded and the number and type of user interactions with the uploaded submissions. Periodically or upon completion of a marketing campaign, the measured user interactions can be totaled with respect to all of the UGC submissions by the server and a formula, similar to any of the formulae outlined above, can be used by the server to calculate an engagement metric. In embodiments where weightings are applied to different forms of engagement, the weighting applied to submitting or creating UGC is typically higher than the weighting applied to viewing a submission.

The server can use an engagement metric calculated with respect to a particular marketing campaign to automatically bill the advertiser responsible for the marketing campaign. In a number of embodiments, the server can charge an entity associated with an online marketing campaign a cost that is determined based upon an engagement score using an e-commerce method such as a credit card transaction or electronic funds transfer. When describing embodiments of the invention, references to the cost of hosting a campaign refer to the cost charged to the advertiser in exchange for the content distribution system hosting the online marketing campaign. In several embodiments, the cost of hosting an online marketing campaign is determined by multiplying the engagement score by a predetermined amount per unit of engagement. In several embodiments, caps are used to limit the cost and/or the rate can increase with increased engagement in a predetermined fashion. In a number of embodiments, each user that engages with a campaign is categorized based upon the user's level of engagement and the cost for hosting the campaign is determined by taking a weighted sum of each different class of user. In other embodiments, an amount of engagement can be pre-purchased and the online marketing campaign ends within a predetermined amount of time following the exhaustion of the pre-purchased engagement.

Providing Content and CPE Based Advertising

Figure 2:
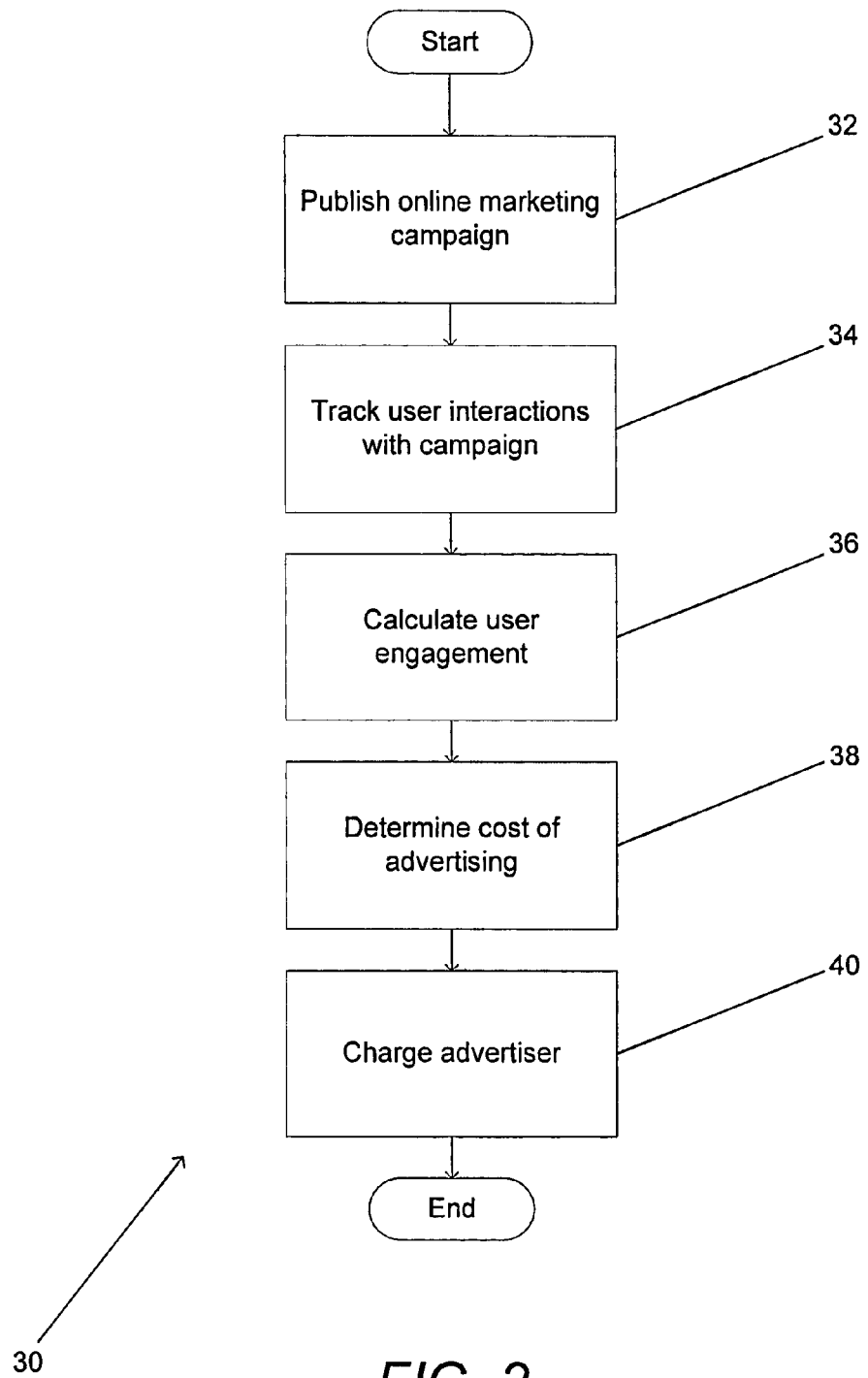
FIG. 2 is a flow chart showing a process for distributing content and charging for associated advertising on a CPE basis.

A process for providing content and CPE based advertising in accordance with an embodiment of the invention is shown in FIG. 2. The process 30 includes launching (32) a marketing campaign. As discussed above, the online marketing campaign can take a number of forms including the distribution of one or more pieces of UGC, a solicitation for UGC in response to a campaign theme or idea or another form that encourages a user to interact with a campaign idea, theme and/or content. The process tracks (34) user interactions with the content and calculates (36) user engagement with the online marketing campaign. The calculated engagement is then used to determine (38) the cost of hosting the campaign and, in a number of embodiments, the cost is automatically charged (40) to the advertiser.

Although a specific process is described above with respect to FIG. 2, other processes that enable users to interact with an online marketing campaign and involve the measurement of specific types of user interaction can be used to provide advertising on a CPE basis in accordance with embodiments of the invention. In many embodiments, the nature of the content distribution system used to conduct a marketing campaign determines the process used to provide advertising on a CPE basis.

Web Sites that Solicit UGC in Response to a Campaign Theme or Idea

U.S. Provisional Patent Application Ser. No. 60/958,219 entitled "Online Content Marketing Platform" to Rose et al. describes Online Marketing Platforms that are examples of content description systems that utilize web sites to conduct marketing campaigns, which solicit UGC in response to a campaign theme or idea. The Online Marketing Platforms are capable of conducting one or a number of different types of campaigns simultaneously. The marketing campaigns that can be conducted using Online Marketing Platforms that include competitions involving a reward, a survey or poll, and/or an opportunity to express a point of view. The type of UGC that can be submitted in response to a campaign hosted on an Online Marketing Platform is typically determined by the campaign creator and can include text, images, audio, video and/or mashups. Many campaigns accept the submission of a single piece of UGC in response to the campaign. Several campaigns accept a number of pieces of UGC content in response to a campaign, including different types of content.

Although the above discussion refers to Online Marketing Campaigns of the type disclosed in U.S. Provisional Patent Application Ser. No. 60/958,219 entitled "Online Content Marketing Platform" to Rose et al., other types of web sites that enable distribution of UGC can be used in accordance with embodiments of the invention.

User Interactions with Web Site Based Marketing Campaigns

A user device that includes a web browsing application, such as but not limited to Internet Explorer 7 distributed by Microsoft Corporation, and at least one media player, such as Adobe Flash Player 9 distributed by Adobe Systems Incorporated of San Jose, Calif., can be used to access content distributed via a web site. The types of user interactions that can be performed are largely determined by the web server.

When an Online Marketing Platform of the type described in U.S. Provisional Patent Application Ser. No. 60/958,219 entitled "Online Content Marketing Platform" to Rose et al. is used to conduct a marketing campaign, a user can engage with the marketing campaign in a variety of ways including the ways described in that application. The user interactions can include uploading UGC in response to a campaign, viewing a UGC submission, voting for a UGC submission commenting or reviewing a UGC submission, sharing a UGC submission with another user, propagating a UGC submission to another web site, reviewing another user's UGC submission, nominating another user's UGC submission for an award, mousing over a UGC submission to obtain additional information about the submission, clicking on a UGC submission, clicking on a specific part of a UGC submission and/or playing a UGC submission. In addition, user interactions can also be measured based upon the time spent on a site or portion of a site associated with a campaign. In other embodiments, other types of user engagement are supported.

Tracking User Interactions

A server in accordance with embodiments of the invention can track user interactions with an online marketing campaign based upon communications received by the server from a user device in a variety of different ways. In a number of embodiments, the server tracks every possible form of user interaction distinguishable using the communications received from a user device. In many embodiments, the communications received from a user device include information such as Uniform Resource Locators (URLs) and the server is configured to distinguish between different types of user interactions based upon the requested URLs. In many embodiments, a user device can be used to interact with a campaign propagated to a remote web site and requests directed to the server that are related to these interactions are tracked.

In a number of embodiments, the communications received from a user device also include information identifying the location of the web site that facilitated a particular user interaction (i.e. the web site being viewed via the user device) and the server can distinguish between and separately track "internal" user interactions and "external" user interactions. An "internal" user interaction can be considered to be a user interaction that is initiated by a user from a web site associated with the marketing campaign. An "external" user interaction can be considered to be a user interaction initiated by a user from a web site to which a marketing campaign and/or UGC submission has been propagated. Some "internal" user interactions can be viral (i.e. stimulated in response to another user's actions web sites other than the web site hosting the online marketing campaign). These are typically user interactions that are performed in response to a recommendation by another user. All "external" user interactions are considered viral. Various techniques for automatically and manually propagating campaigns and UGC submissions to other web sites are discussed in U.S. Provisional Patent Application Ser. No. 60/958,219 entitled "Online Content Marketing Platform" to Rose et al., the disclosure of which is incorporated by reference above.

In a number of embodiments, the server is configured to track user interactions that cannot be detected at the time of the interaction due to the fact that the user interaction does not involve a communication with the server. For example, a user's manual propagation of a campaign and/or a UGC submission to a web site that is not associated with a marketing campaign is a form of user interaction that does not give rise to a communication with the server hosting the campaign at the time of the propagation. However, a user who interacts with a manually propagated campaign and/or UGC submission does communicate with the server and, in many embodiments, the communication indicates the location of the propagated campaign and/or UGC submission. Therefore, the first communication generated by a user interacting with a manually propagated campaign and/or UGC can be compared by a server tracking user interaction to a list of known propagated sites and then identified as a previously unrecorded manual propagation of the campaign and/or UGC content. In other embodiments, other patterns of communications received by a server tracking user interactions can be used to track user interactions that do not give rise to a communication with the server at the time of the user interaction.

Servers in accordance with many embodiments of the invention can maintain tallies of user interactions and use the tallies to calculate user engagement. In several embodiments, a server records information concerning each user interaction in a database. In a number of embodiments, each user interaction is associated with the specific piece of content to which the interaction relates. In several embodiments, each user interaction recorded in the database is associated with the user responsible for the interaction. When the server calculates user engagement, the server can search the database and develop tallies concerning each different form of user interaction. Tracking of user engagement is discussed in U.S. Provisional Patent Application Ser. No. 60/958,219 entitled "Online Content Marketing Platform" to Rose et al., the disclosure of which is incorporated by reference above.

Calculating User Engagement

In many embodiments, a formula is used to calculate a measurement of user engagement based upon tallies of different types of user interactions with the UGC submitted in response to a marketing campaign. In a number of embodiments, a weighted average is used to calculate the user engagement. As discussed above, one formula that can be used is a weighted sum of the different types of user interactions. The weightings applied with respect to each type of user interaction reflect the extent to which each type of user interaction is indicia of engagement. In embodiments where weightings are used, the weightings are typically agreed to prior to conducting the marketing campaigns.

In embodiments where the interactions of individual users are recorded, each user can be categorized into predefined categories according to the user's level of engagement and overall engagement with the campaign can be calculated as a weighted sum of the total number of users that engaged with the UGC submissions.

In many embodiments, the calculated user engagement and information used in the calculation of the user engagement can be used to generate reports that summarize user engagement with a marketing campaign. Generating reports with respect to user engagement is discussed in U.S. Provisional Patent Application Ser. No. 60/958,219 entitled "Online Content Marketing Platform" to Rose et al., the disclosure of which is incorporated by reference above.

Determining Cost of Advertising

Once an engagement value has been determined, the engagement value can be used to determine the cost charged to the advertiser or sponsor responsible for conducting the campaign. In many embodiments, the cost is simply determined by multiplying the engagement value by an amount per unit of engagement. In several embodiments, the cost can be determined on a tiered basis to incentivize the attainment of higher levels of engagement. In other embodiments, almost any financial arrangement can be entered into that utilizes the measured engagement value to determine the cost that should be charged to an advertiser for conducting a marketing campaign.

Automatically Charging Advertiser

In a number of embodiments, the cost of hosting an online marketing campaign is automatically charged to the advertiser or sponsor. The charge can be completed using a credit card transaction, an electronic funds transfer using a service, such as the service provided by PayPal.com, or any other means for issuing invoices and/or for securing payment.

While the above description contains many specific embodiments of the invention, these should not be construed as limitations on the scope of the invention, but rather as an example of one embodiment thereof. For example, although the discussion above includes frequent references to web sites that distribute UGC, systems and methods in accordance with embodiments of the invention can be used to conduct CPE based marketing campaigns in conjunction with the distribution of professionally generated content and/or content generated by the content distributor. In addition, content can be distributed in accordance with embodiments of the invention in ways that do not rely on the use of a web site and that enable users to engage with the content. For example, content can be distributed via an RSS fee, via a WAP site, email, IM, WOM (word of mouth offline), SMS messaging, MMS messaging and via a user interface generated by a networked consumer electronics device. Accordingly, the scope of the invention should be determined not by the embodiments illustrated, but by the appended claims and their equivalents.

What is claimed:

1. An online content distribution system that hosts an online marketing campaign, comprising:
   a server connected to a network; and
   a plurality of use devices connected to the network;
   wherein the server is configured to host an interactive web site that provides access to at least one piece of content that forms part of the marketing campaign;
   wherein the interactive web site enables the uploading of pieces of content in response to the online marketing campaign and the distribution of pieces of uploaded content;
   wherein that at least one piece of content that forms part of the marketing campaign is a piece of uploaded content;
   wherein each user device is configured to interact with the interactive web site;
   wherein the server is configured to track the number of times the at least one piece of content that forms part of the marketing campaign is accessed and the number of other interactions that user devices have with the interactive web site;
   wherein the number of other interactions that user devices have with the web site are selected from the group consisting of uploading a piece of content, voting for a piece of content, commenting on a piece of content, reviewing a piece of content, sharing a piece of content with a user device, and propagating a piece of content to a second web site distinct from the interactive web site; and
   wherein the server is configured to determine a cost to charge for hosting the marketing campaign based upon at least the number of times that at least one piece of content that forms part of the marketing campaign is accessed and the number of other interactions that user devices have with the web site;
   the web site enables a user device to automatically propagate a piece of content to another web site; and the interactions tracked by the server include tracking the number of times the at least one piece of content that forms part of the marketing campaign is propagated to another web site.

2. The system of claim 1, wherein:
the web site enables user devices to vote for a piece of content; and the interactions tracked by the server include tracking the number of votes cast from user devices with respect to the at least one piece of content that forms part of the marketing campaign.

3. The system of claim 1, wherein:
the web site enables user devices to post comments with respect to a piece of content; and
the interactions tracked by the server include tracking the number of comments posted from user devices with respect to the at least one piece of content that forms part of the marketing campaign.

4. The system of claim 1, wherein,
the website enables a first user device to be used to recommend a piece of content to a second device; and
the interactions tracked by the server include tracking the number of times the at least one piece of content that forms part of the marketing campaign is recommended.

5. The system of claim 1, wherein:
the user devices are configured to interact with pieces of content that have been automatically propagated to other websites;
the service is configured to track interactions between user devices and propagated pieces of content.

6. The system of claim 1, wherein:
the web site includes a web page that enables a user device to mouse over a region of the web page to obtain additional information concerning a piece of content; and
the interactions tracked by the server include tracking the number of times that additional information is obtained concerning the at least one piece of content that forms part of the marketing campaign.

7. The system of claim 1, wherein the web site includes web pages that enable a user device to click on a region of the web page to access a piece of content.

8. The system of claim 1, wherein:
the web site includes a web page that enables to user device to click on multiple regions of the web page to access a piece of content; and
the interactions tracked by the server include tracking the number of times that each of the regions is clicked on to access the at least one piece of content that forms part of the marketing campaign.

9. The system of claim 1, wherein:
the web site includes web pages that enable it user device to click on a region of the web page to play a piece of content; and
the interactions tracked by the server include tracking the number of times that the at least one piece of content that forms part of the marketing campaign is played.

10. The system of claim 1, wherein the at least one piece of content that forms part of the marketing campaign is text posted in the form of a blog.

11. The system of claim 1, wherein the at least one piece of content that forms part of the marketing campaign is audio posted in the form of a podcast.

12. The system of claim 1, wherein the at least one piece of content that forms part of the marketing campaign is an image.

13. The system of claim 1, wherein the at least one piece of content that forms part of the marketing campaign is a video.

14. The system of claim 13, wherein the video is a mashup.

15. The system of claim 1, wherein:
the server is configured to track a plurality of different types of interactions that user devices have with the web site; and
the server is configured to determine the cost to charge for hosting the marketing campaign by taking a weighted sum of the number of times the at least one piece of content that forms part of the marketing campaign is accessed and the number of at least one of the different types of tracked interaction.

16. The system of claim 1, wherein the server is configured to automatically bill an entity associated with the online campaign for the determined cost to charge for hosting the marketing campaign.

17. A system for conducting an online marketing campaign, comprising:
a server connected to a network; and
a plurality of user devices connected to the network;
wherein the server is configured to host an interactive web site that enables the uploading of pieces of content in response to the online marketing campaign and the distribution or pieces of uploaded content;
wherein each user device is configured to interact with the interactive web site;
wherein the server is configured to track the number of pieces of content uploaded to the interactive web site in response to the online marketing campaign, the number of pieces of uploaded content distributed to user devices and the number of other interactions between the user devices and the interactive web site;
wherein the number of other interactions that user devices have with the web site are selected from the group consisting of uploading a piece of content, voting for a piece of content, commenting on a piece of content, reviewing a piece of content, sharing a piece of content with a user device, and propagating a piece of content to a second web site distinct from the interactive web site; and
wherein the server is configured to determine a cost to charge for hosting the marketing campaign based upon at least the number of pieces of content uploaded to the interactive web site in response to the online marketing campaign, the number of pieces of uploaded content distributed to user devices and the number of other interactions between the user devices and the website;
wherein the web site enables a user device to automatically propagate a piece of content to another web site; and
wherein the interactions tracked by the server include tracking the number of times the at least one piece of content that forms part of the marketing campaign is propagated to another web site.

18. The system of claim 17, wherein:
the web site enables user devices to vote for a piece of content uploaded in response to the marketing campaign; and
the interactions tracked by the server include tracking the number of votes cast from user devices with respect to pieces of content uploaded in response to the marketing campaign.

19. The system of claim 17, wherein:
the web site enables user devices to post comments with respect to pieces of content uploaded at response to the marketing campaign; and
the interactions tracked by the server include tracking the number of comments posted from user devices with respect to pieces of content uploaded in response to the marketing campaign.

20. The system Of claim 17, wherein:
the web site enables a first user computer to be used to recommend a piece of content uploaded in response to the marketing campaign to a second user device; and
the interactions tracked be the server include tracking the number of times pieces at content uploaded in response to the marketing campaign are recommended.

21. The system of claim 17, wherein:
the user devices are configured to interact with pieces of content that have been automatically propagated to other websites; and
the server is configured to track interactions between user devices and propagated pieces of content.

22. The system of claim 17, wherein:
the web site includes a web page that enables a user device to mouse over a region of the web page to obtain additional information concerning a piece of content uploaded in response to the marketing campaign; and
the interactions tracked by the server include tracking the number of times that additional information is obtained concerning pieces of content uploaded in response to the marketing campaign.

23. The system of claim 17, wherein the web site includes web pages that enable a user device to click on a region of the web page to access a piece of content uploaded in response to the marketing campaign.

24. The system of claim 17, wherein:
the web site includes a web page that enables a user device to click on multiple regions of the web page to access a piece of content uploaded, in response to the marketing campaign; and
the interactions tracked by the server include tracking the number of times that each of the regions is clicked on to access a piece of content uploaded in response to the marketing campaign.

25. The system of claim 17, wherein:
the web site includes web pages that enable a user device to click on a region of the web page to play a piece of content uploaded in response to the marketing campaign; and
the interactions tracked by the server include tracking the number of times that pieces of content uploaded in response to the marketing campaign are played.

26. The system of claim 17, wherein the pieces of content uploaded in response to the marketing campaign include text posted in the form of a blog.

27. The system of claim 17, wherein the pieces of content uploaded in response to the marketing campaign include audio posted in the form of a podcast.

28. The system of claim 17, wherein the pieces of content uploaded in response to the marketing campaign include an image.

29. The system of claim 17, wherein the pieces of content uploaded in response to the marketing campaign include video.

30. The system of claim 29, wherein the video is a mashup.

31. The system of claim 17, wherein:
the server is configured to track a plurality of different types of interactions that user devices have with the web site; and
the server is configured to determine the cost to charge for hosting the marketing campaign by taking a weighted sum of the number of times the at least one piece of content that forms part of the marketing campaign is accessed and the number of at least one of the different types of tracked interactions.

32. The system of claim 31, wherein the server is configured to measure the time a user device spends interacting with the web site.

33. The system of claim 17, wherein the server is configured to automatically bill an entity associated with the online campaign for the determined cost to charge for hosting the marketing campaign.

34. A method of determining the cost of conducting an online marketing campaign, comprising:
providing an interactive website that enables the uploading of pieces of content in response to the online marketing campaign and the distribution of pieces of uploaded content using a server system;
uploading content to the interactive website using a user device;
tracking a plurality of categories of user interactions with the interactive website and the uploaded content using the server system where the number of other interactions that use devices have with the interactive website are selected from the group consisting of uploading a piece of content, voting for a niece of content, commenting on a piece of content, reviewing a piece of content, sharing a piece of content with a user device, and propagating a piece of content to a second website distinct from the interactive website; and
calculating a cost for conducting the online marketing campaign based upon the different categories of tracked interactions using the server system;
the web site enables a user device to automatically propagate a piece of content to another web site; and
the interactions tracked by the server include tracking the number of times the at least one piece of content that forms part of the marketing campaign is propagated to another web site.

35. The method of claim 34, further comprising automatically billing an entity associated with the online marketing campaign for the cost of conducting the online marketing campaign using the server system.

36. An online content distribution system that hosts an online marketing campaign, comprising:
a serve; connected to a network; and
a plurality of user devices connected to the network;
wherein the server is configured to host an interactive web site that provides access to at least one piece of content that forms part of the marketing campaign;
wherein the interactive web site enables the uploading of pieces of content in response to the online marketing campaign and the distribution of pieces of uploaded content;
wherein that at least one piece of content that forms part of the marketing campaign is a piece of uploaded content;
wherein each user device is configured to interact with the interactive web site;
wherein the server is configured to track the number of times the at least one piece of content that forms part of the marketing campaign is accessed and the number of other interactions that user devices have with the interactive web site;
wherein the number of other interactions that user devices have with the web site are selected from the group consisting of uploading a piece of content, voting for a piece of content, commenting on a piece of content, reviewing a piece of content, sharing a piece of content with a user device, viewing a shared piece of content, and propagating a piece of content to a second web site distinct from the interactive web site;

wherein the server is configured to determine a cost to charge for hosting the marketing campaign based upon at least the number of times that at least one piece of content that forms part of the marketing campaign is accessed and the number of other interactions that user devices have with the web site;

the web site enables a user device to automatically propagate a piece of content to another web site; and the interactions tracked by the server include tracking the number of times the at least one piece of content that forms part of the marketing campaign is propagated to another web site.

\* \* \* \* \*